US008966512B2

(12) United States Patent
Sivertsen

(10) Patent No.: US 8,966,512 B2
(45) Date of Patent: Feb. 24, 2015

(54) INSERTING ADVERTISEMENT CONTENT IN VIDEO STREAM

(75) Inventor: Clas Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 185 days.

(21) Appl. No.: 13/188,930

(22) Filed: Jul. 22, 2011

(65) Prior Publication Data

US 2013/0024888 A1 Jan. 24, 2013

(51) Int. Cl.
| | | |
|---|---|---|
| H04H 60/33 | (2008.01) | |
| G06F 3/00 | (2006.01) | |
| G06F 13/00 | (2006.01) | |
| H04N 5/445 | (2011.01) | |
| H04N 21/431 | (2011.01) | |
| H04N 21/44 | (2011.01) | |
| H04N 21/81 | (2011.01) | |

(52) U.S. Cl.
CPC ..... H04N 21/4312 (2013.01); H04N 21/44008 (2013.01); H04N 21/44016 (2013.01); H04N 21/812 (2013.01)
USPC ......... 725/9; 725/10; 725/12; 725/37; 725/40

(58) Field of Classification Search
CPC .......... H01N 21/4383; H01N 21/6543; H01N 21/4751; H01N 21/43615; H01N 21/4622; H01N 21/4661; H01N 21/4668; H01N 21/436; H01N 21/4316; H01N 21/478
USPC .................................................. 725/32, 40
See application file for complete search history.

(56) References Cited

U.S. PATENT DOCUMENTS

| | | |
|---|---|---|
| 5,986,692 A | 11/1999 | Logan et al. |
| 7,266,832 B2 | 9/2007 | Miller |
| 2002/0144263 A1 | 10/2002 | Eldering et al. |
| 2003/0066078 A1* | 4/2003 | Bjorgan et al. ............ 725/34 |
| 2003/0226147 A1 | 12/2003 | Richmond et al. |
| 2004/0237102 A1 | 11/2004 | Konig et al. |
| 2005/0015815 A1* | 1/2005 | Shoff et al. ............. 725/135 |
| 2005/0097622 A1 | 5/2005 | Zigmond et al. |
| 2006/0282319 A1 | 12/2006 | Maggio |
| 2008/0320513 A1* | 12/2008 | Wong et al. ............. 725/38 |
| 2009/0161752 A1 | 6/2009 | Gong et al. |
| 2009/0241141 A1* | 9/2009 | Noh et al. ............... 725/32 |
| 2009/0249426 A1 | 10/2009 | Aoki et al. |
| 2009/0313654 A1* | 12/2009 | Paila et al. .............. 725/32 |
| 2010/0180304 A1* | 7/2010 | Hassell et al. ........... 725/44 |
| 2010/0199318 A1 | 8/2010 | Chang et al. |
| 2010/0251289 A1 | 9/2010 | Agarwal et al. |

(Continued)

OTHER PUBLICATIONS

International Search Report dated Nov. 29, 2012 in PCT/US2012/047697.

*Primary Examiner* — Benjamin R Bruckart
*Assistant Examiner* — Akshay Doshi
(74) *Attorney, Agent, or Firm* — Lee & Hayes, PLLC

(57) ABSTRACT

A system and method for inserting advertising content in a video stream are provided. A screen layout includes a plurality of sections is determined with reference to user-designated parameters or with reference to pre-set rules. An output video stream is generated, in which an input video stream received through an input port is shown in one of the sections of the screen layout and supplemental content comprising advertising received through a content port is shown one or more other sections of the screen layout. The output video signal is then output to a display device through a video output port.

16 Claims, 7 Drawing Sheets

(56) References Cited

U.S. PATENT DOCUMENTS

| | | |
|---|---|---|
| 2010/0325659 A1 | 12/2010 | Shkedi |
| 2010/0328492 A1 | 12/2010 | Fedorovskaya et al. |
| 2011/0082915 A1* | 4/2011 | Carr et al. ................ 709/219 |
| 2011/0093877 A1* | 4/2011 | Beser et al. ................ 725/12 |
| 2011/0126228 A1* | 5/2011 | Lee et al. ................ 725/34 |
| 2011/0145074 A1 | 6/2011 | Polizzotto et al. |
| 2011/0258049 A1* | 10/2011 | Ramer et al. ............ 705/14.66 |
| 2012/0072936 A1* | 3/2012 | Small et al. ................ 725/10 |

* cited by examiner

INSERTING ADVERTISEMENT CONTENT IN VIDEO STREAM

TECHNICAL FIELD

The present invention is related to advertisement insertion and/or substitution. More particularly, techniques are disclosed for controlling the presentation of advertising content in a video stream provided to a display device where desired advertisements are inserted into normal programming as well as during commercial breaks. The present invention is also related to ad substitution and ad avoidance techniques, as well as to the use of demographics in selecting advertising content.

BACKGROUND

Digital signs are increasingly replacing traditional paper-based signs, such as posters, painted billboards, and light boxes. Typical displays used for digital signs include LCD (liquid crystal display) monitors, plasma displays, OLED (organic light-emitting diode) monitors, and e-paper (electronic paper) displays. Such digital signs based on these displays are commonly found in indoor areas, for example, in restaurants, bars, clubs, public transportation hubs, stadiums, and hospitals. The digital signs are often based on using digital televisions having flat panel displays.

In many of these public areas televisions are frequently used to deliver television content to entertain waiting customers, commuters, patients, etc. These very locations frequently also have digital signs to inform or advertise to these same viewers. However, there are several disadvantages encountered when digital signs are placed in these areas along with televisions. For example, co-locating a digital sign next to, or in the vicinity of, a television would result in competing for the attention of the audience, and hence limiting the effectiveness of advertising. Moreover, significant electricity consumption would result from co-locating two or more display devices in a single area. Furthermore, there may not be sufficient space to collocate the two devices. Nevertheless, it is not uncommon to see a digital sign placed next to a television in many public locations.

Hence, there is a need for a mechanism to provide digital sign capabilities to televisions, that would allow both a digital sign capable and television signals to be presented to viewers. It is with respect to these considerations and others that the present invention has been made.

SUMMARY

It should be appreciated that this Summary is provided to introduce a selection of concepts in a simplified form that are further described below in the Detailed Description. This Summary is not intended to be used to limit the scope of the claimed subject matter.

One exemplary embodiment provides a method for controlling presentation of advertising content in a video stream provided to a television. The operations include determining a screen layout comprising a first section and a second with reference to user-designated parameters, generating an output video stream comprising commercially available television video signals received at an input port and supplemental content received at a content port that is distinct from the input port, wherein output video stream is configured so that the television video signals are displayed in a first section of the screen layout and the supplemental content is displayed in a second section of the screen layout, and transmitting the output video signal to the television through a video output port.

Another exemplary embodiment provides a method for controlling presentation of advertising content in a video stream to a television, that includes the operations of receiving at an input port an input video stream comprising commercially available television video signals, the television video signals comprising a commercial and analyzing the input video stream to detect a start of the commercial in the input video stream. The operations further include receiving at a content port supplemental content comprising an advertisement, replacing the commercial with the advertisement from the supplemental content, and transmitting the output video signal to the television through a video output port.

Another exemplary embodiment for a method for controlling presentation of advertising content in a video stream provided to a television, includes the operations of receiving at an input port an input video stream comprising commercially available television video signals, the available television video signals comprising a commercial, analyzing the input video stream to detect a start of the commercial, and changing channels until a channel is found that is not presently showing another commercial.

Another exemplary embodiment provides a system for inserting advertising content in a video stream, that includes an input port configured to receive an input video stream comprising television signals from a commercial television signal service provider, a video output port for connection to a television, the video output port providing the video stream, a content port for receiving supplemental content, and a processor. The processor is configured to determine a screen layout including a plurality of sections based on user-designated parameters or using pre-set rules, generate the output video stream wherein the output video stream is configured so that the input video stream is shown in a first section of the screen layout and the supplemental content is shown in a second section of the screen layout, and transmit the output video signal to the display device through the video output port.

Another exemplary embodiment is a system for controlling presentation of advertising content in a video stream that include an input port configured to receive an input video stream comprising television signals from a commercial television signal service provider, a video output port for connection to a television, the video output port providing the video stream, and a processor. The processor is configured to analyze the input video stream to detect a start and an end of a commercial in the input video stream, and change channels to a channel that is not presently showing commercials.

In another exemplary embodiment, a computer-readable storage medium having computer-readable instructions that is provided that when executed by a computer cause the computer to determine a screen layout associated with an output video signal using user-designated parameters, wherein the screen layout comprises a first section and a second section, generate the output video signal, wherein the output video signal comprise an input video stream, and wherein the input video stream comprises commercially available television signals received at an input port. Furthermore, at least a portion of the content of the input video stream is shown in the first section of the screen layout and supplemental content received through a content port is shown the second section of screen layout. In addition, the computer readable instructions also cause the computer to transmit the output video signal to a television through a video output port.

These and other embodiments and advantages of the present invention may become apparent from the following detailed description, taken in conjunction with the accompanying drawings, illustrating by way of example the principles of the invention.

DETAILED DESCRIPTION

Figure 1A:
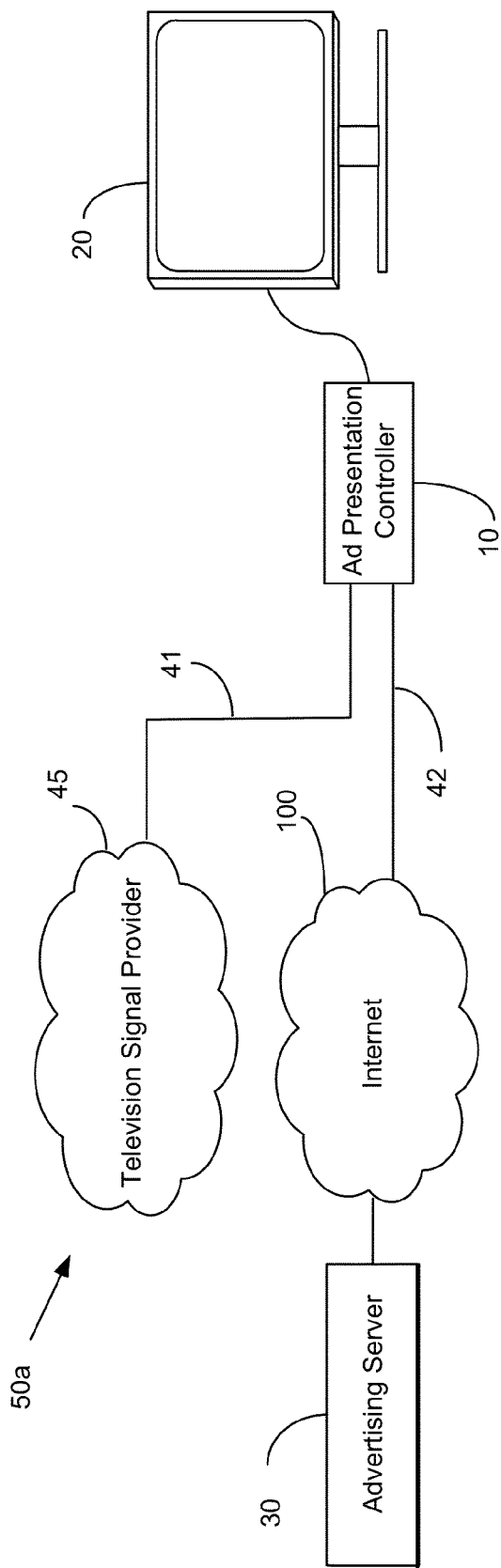
FIGS. 1A and 1B illustrate a block diagram of two contexts for deploying an ad presentation controller controlling the presentation of advertisement content in a video stream according to an embodiment of the present disclosure.

Embodiments disclosed herein provide a system and method for controlling the presentation of advertisement content in a video stream. "Controlling" advertisement presentation includes, but is not limited to inserting advertising, replacing or substituting advertising, and avoiding the presentation of advertising. In the following detailed description, references are made to the accompanying drawings that form a part hereof, and in which are shown by way of illustration specific embodiments or examples. Referring now to the drawings, in which like numerals represent like elements through the several figures, aspects of the various embodiments will be described.

Referring to FIG. 1A, a high level block diagram 50a illustrates one context of how the ad presentation controller ("APC") can be employed. In FIG. 1A, a television signal provider 45 provides television signals. The television signal provider can be any source of commercially available television signals, such as a cable company, a satellite dish service provider, or a local over-the-air broadcast television station. Other signals/television service providers include providers that use other wireless, wired, or fiber based distribution systems, including Internet based distribution techniques. For purposes of illustration, the television signal provider is presumed to be a cable service provider. The television signal provider can provide analog or digital signals, and in the embodiment of FIG. 1A, a coaxial cable 41 is used to represent the distribution of television signals to a physical location where the television is located.

The APC 10 is typically collocated on the premises with the television and receives the television signals over the coaxial cable 41 and provides the modified output signals to a display device in the form of a television 20. The television can be any well known display device capable of presenting video images based on various technologies including LCD, plasma, LED, etc. The APC 10 also is connected to the Internet 100 via transmission facility 42, which can be any one of the variety of well known Internet access interfaces. Although a wired transmission facility is illustrated, other forms of wireless transmission could be used to provide connectivity between the APC 10 and the Internet 100.

Also connected to the Internet 100 is an advertising server 30, which stores, manages, and is able to transmit digital video advertising and control information to the APC. The provision of digital video advertising between the advertising server 30 and the APC can occur on a "push" basis where the advertising server 30 periodically downloads digital video advertising to the APC. Alternatively, the APC can "pull" or request advertisements from the advertising server 30. Control information may also be provided with the advertising content that indicates rules when the advertisement is to be played and how. For example, the advertising server may provide advertising content in the form of video with instructions that the advertisement is to replace certain advertisements embedded with the television programming. Or the advertising server may provide advertising content in the form of text with instructions that a banner ad is to be provided at the bottom of the television programming at five minute intervals.

Thus, the APC receives television signals and digital video advertisement ("DVA"), and can send a digital (or analog) television signal to the television 20 by incorporating the digital video advertisement in some manner with the television signals. In one embodiment, the APC is able to overlay the DVA onto the television signal and transmit the resulting video signal to the television. In another embodiment, the APC is able to substitute a DVA for the current television signals for a limited time. In another embodiment, the APC is able to combine the DVA and the television signal so that a portion of the television signal is replaced with the DVA. Other variations are possible, which one skilled in the art can develop in light of the present disclosure.

Figure 1B:
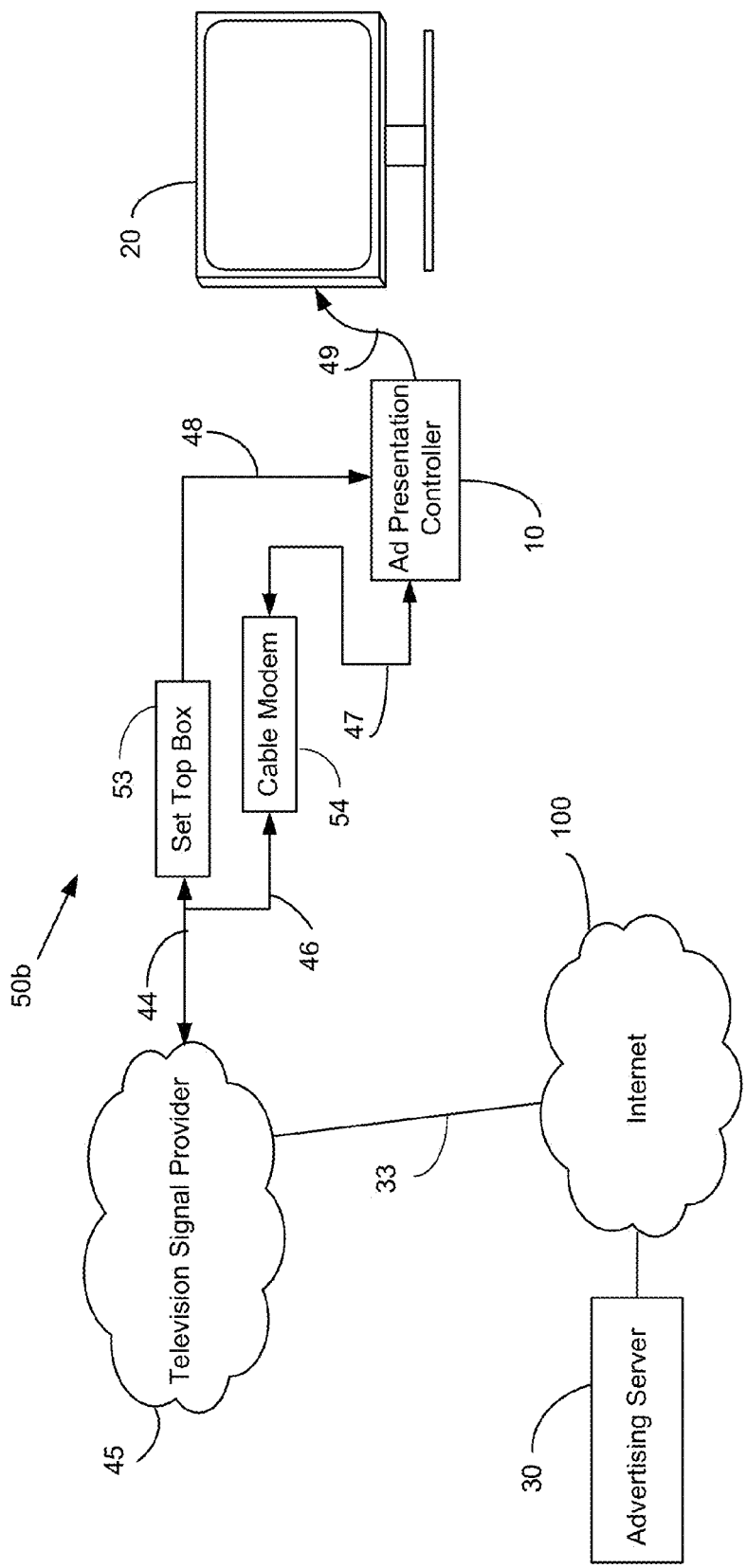

FIG. 1B illustrates another embodiment 50b of the APC, also involving a television signal provider. In this embodiment, the television signal provider 45 is also a cable service provider, but provides both television and cable modem (broadband) access to the Internet. The coaxial cable 44 in this embodiment is provided by the cable service provider and received by a set top box 53. The set top box 53 generates video signals over wire 48, which can be received by a television. However, in this embodiment, the video output from the set top box is provided to the APC. The APC can then provide the video output via cable 49 to the television 20. Any switching of the channel typically occurs in the set top box 53.

The APC receives Internet access by connecting via cable 47 to a cable modem 54, which in turn accesses the coaxial cable 44 using cable 46. In this arrangement, both television signals and Internet access is provided by the cable service provider. Finally, the advertising server 30 is also shown as connected to the Internet 100, and facilities 33 provide Internet access to the television signal provider 45.

The APC can be deployed, for example, in a bar or entertainment establishment where custom advertising is desired to be provided to their patrons. For example, a text based banner advertisement for a dinner or drink special could be loaded on the advertising server 30 from a computer by the bar operator, transmitted to the APC, and then periodically presented by overlaying the advertising and scrolling the text in a section of the television screen, simultaneously with the television programming on the television. Because the APC controls the insertion of advertising after the set top box has converted, switched, and otherwise processed the video signal, the APC can insert the advertisement on whatever video programming is presented on the television. There is no requirement that the advertising be conveyed by the television signal provider, as is done with current television advertising arrangements.

In alternative embodiments, the advertising could be stored on a so-called "thumb-drive" or memory card and loaded into the APC by physically plugging the memory card into the APC, rather than downloading the advertising from the advertising server. Other embodiments are disclosed herein for locally loading the advertisement into the APC. In some embodiments, the APC can be a stand-alone unit, which is deployed in the configurations shown in FIG. 1A or 1B. In other embodiments, the APC can be integrated into a personal computer receiving video signals. In this embodiment, the keyboard and the display screen can provide administration controls for providing input parameters, defining which sections the advertisements should be presented on, when they should be presented, etc. In this configuration, the APC is a stand-alone system that can operate without relying on the advertising server downloading the advertising content.

Figure 2:
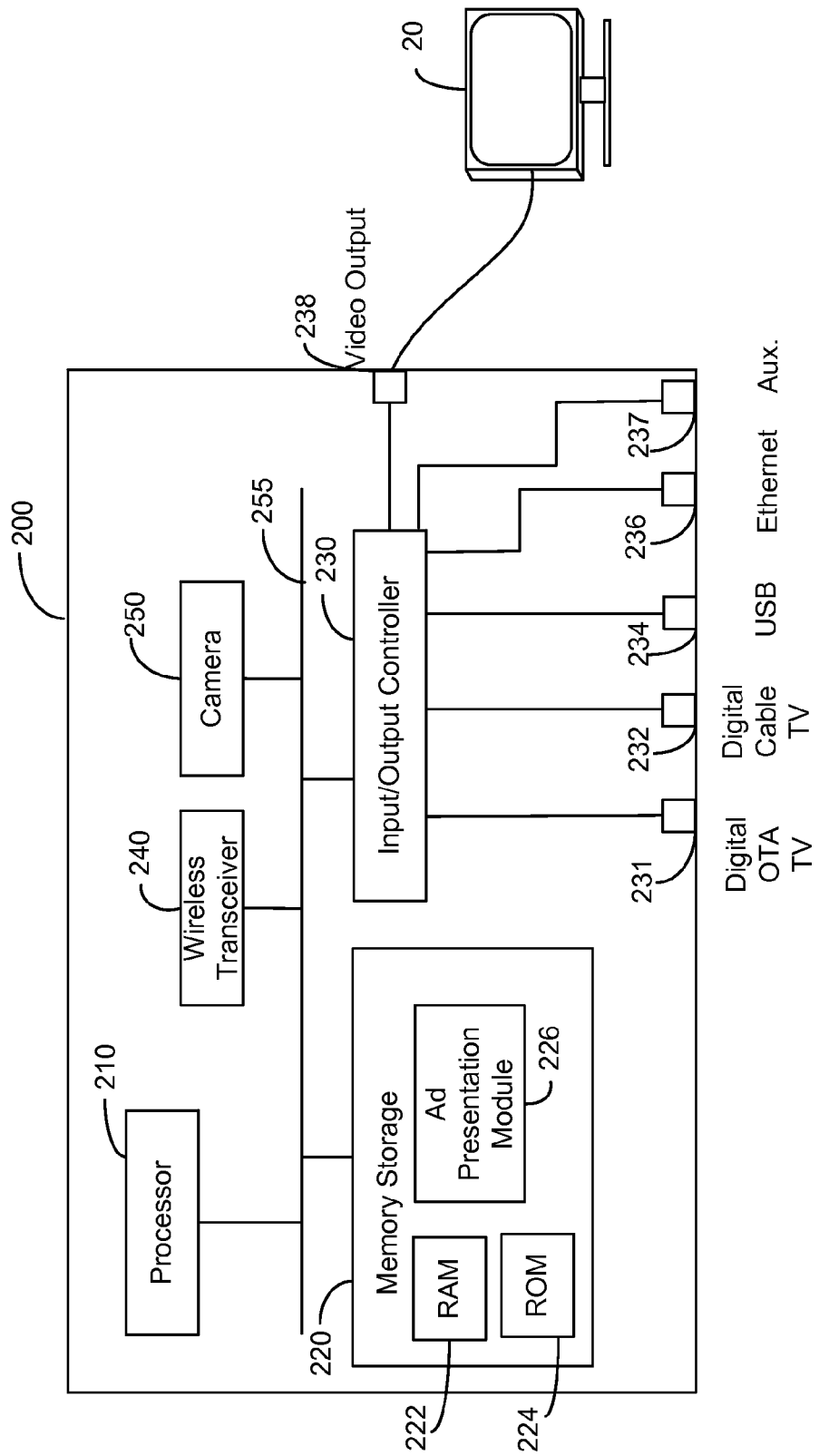
FIG. 2 is an overview of the ad presentation controller according to an embodiment of the present disclosure.

Referring to FIG. 2, a block diagram 200 illustrates one embodiment of the architecture of an APC 10 for controlling the presentation of advertisement content in a video stream. The APC 10 is connected to a display device 20 which may be an LCD television, a plasma display, an OLED television, an e-paper display, etc. The APC 10 may be implemented as an external device to the television 20 with its own power source, or may be embedded or otherwise incorporated within the television 20.

In one embodiment, the APC 10 comprises a processor 210, a memory storage 220, and an input/output ("I/O") controller 230. The processor 210 performs overall control of the system 200 and is coupled to the memory 220 and to the I/O controller 230 via a bus 255. The processor 210 may be constructed from any number of transistors or other circuit elements, which may individually or collectively assume any number of states. The processor could also be a microcontroller, microprocessor, or digital signal processor. More specifically, the processor 210 may operate as a state machine or finite-state machine. Such a machine may be transformed to a second machine, or a specific machine, by loading executable instructions contained within the program modules. These computer-executable instructions may transform the processor 210 by specifying how the processor 210 transitions between states, thereby transforming the transistors or other circuit elements constituting the processor 210 from a first machine to a second machine, wherein the second machine may be specifically configured to perform the operations disclosed herein. The states of either machine may also be transformed by receiving input from one or more ports including the digital over-the-air television input port 231, digital cable television input port 232, USB input/output 234, Ethernet port 236, or other ports or peripherals. The processor may also transform states, or various physical characteristics of various output devices such as printers, speakers, video displays, or otherwise.

The memory storage 220 may be various forms of mass, including solid state memory or rotating disk drives. The memory storage store digital advertisements, which are received from a remote advertising server, or loaded from a memory card. Memory storage 22 also stores programs for use by the processor 210. One such program stored in memory storage is the ad presentation module 226, that stores instructions which when executed cause the processor to perform the methods disclosed herein. The memory may also be used to store the processing results of the processor and/or image data received from a camera 250. The memory storage 220 is connected to the processor 210 through a bus 255.

The memory storage 220 is a form of computer-readable media and can comprise volatile memory in the form of RAM 222 and non-volatile storage in the form of ROM 224. The computer-readable media referenced herein refers to any type of storage device, such as a hard disk or CD-ROM drive, or any other available storage media that can be accessed by the system 200.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the system 200.

The APC also comprises I/O controller 230, which provides for various input and output signals at various input ports and output ports. These include: a digital over-the-air ("OTA") interface 231 for receiving broadcast digital TV signals, as well as an interface 232 for receiving digital cable television signals from a cable service provider. Other input ports include one or more universal serial bus ("USB") ports 234, an Ethernet based port 236, and an auxiliary port 237. Various types of technologies and interfaces can be used in lieu of, or in addition to, the above identified port types.

These ports allow reception of analog or digital video signals of various formats, including signals from a DVD (digital versatile disc) player, an iPOD®, or any other video or audio source. The ports also allow receiving video content from the Internet, such as Web TV, Hulu®, YouTube®. The video content received can be programming video onto which the advertising content is provided with, or it can be the advertising content. The video can be from a web advertising portal, and can provide a web page for control of the APC 10. Further, the USB port 234 can be used to retrieve advertising content from an external device, such as a flash drive or an external hard drive. Additional USB ports can be provided and used for additional USB devices as content sources, such as a USB TV tuner, a USB radio tuner, or a USB satellite TV tuner. Other USB ports can be used to provide video from a USB security camera (not shown) for use in demographic analysis (to be described below). Finally, the I/O controller 230 provides a video output port 238 for connection to the video display device 20.

It should be appreciated that the APC 10 may include fewer or more ports than described above. For example, only one of either the digital OTA port 231 or the digital cable 232 port may be provided to receive a video stream, and more than one USB port can be provided for connection to the above identified devices for receiving advertising content.

The APC 10 may also comprise a wireless transceiver 240 for wireless communication with an external device or wireless connection to the Internet via radio frequency communication, microwave communication, or IR (infrared) short-range communication. The wireless transceiver 240 is coupled to the processor 210 using bus 255.

The APC 10 may further comprise an internal camera 250 for use as a security camera and/or a camera for demographic analysis. In some embodiments, the wireless transceiver 240 may be used also for a wireless external camera, which may capture images of the audience and transmit a corresponding image signal to the APC 10 through the wireless transceiver 240, or back to the advertising server 30.

Advertising content and other information may be received from the web advertising portal through connection to the Internet via the Ethernet port 236, as described above, via the wireless transceiver 240, or from a locally attached memory card via the USB port 234. The term "network port" used herein may refer to any port used to access the Internet, and typically refers to either the Ethernet port 236 or the wireless transceiver 240. The advertising content and other information may be stored in the memory storage 220. As will be described below, in addition to advertisements, the advertising content may include other information, such as stock information, weather information, time information, restaurant specials, etc. To simplify the explanation to follow, the "supplemental content" is used hereinafter to refer to "advertising content and other information" that is provided to the APC for inclusion into the television signals. Specifically, supplemental content does not include advertising content normally provided with the television signals as part of the television service. Such advertising is embedded into the television programming delivered by the service provider.

Control by the processor 210 referred to herein as "ad insertion" will now be described. It should be appreciated that the logical operations described herein are implemented (1) as a sequence of computer implemented acts or program modules running on a processor of the APC 10 and/or (2) as interconnected machine logic circuits or circuit modules within the APC 10. The implementation is a matter of choice dependent on the performance requirements of the system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed, and in any order, than those shown and described herein.

The parameters that control ad insertion by the processor 210 of the APC 10 may be established using a web page provided using a web server executing in the APC. As an example, the web server may be executing in the memory storage 220 by processor 210. That is, a user may enter parameters to control ad insertion by the processor 210 using a personal computer with a browser connected to the Internet and accessing the web page provided using the web server. Alternatively, the user may connect I/O (input/output) devices, such as a keyboard and a mouse, to the I/O controller 250, and the processor 210 may perform control such that the display device 20 is used as a configuration interface to establish the parameters for ad insertion and for other control by the processor 210. In other embodiments, the web server may be executing in the advertising server, and the parameters can be downloaded to the APC 10 by the advertising server 30. The control parameters can be HTML formatting information, frequency of display information, type of display, rules for controlling ad display, how the display is to be divided by sections, etc.

With ad insertion, the processor 210 controls the insertion of supplemental content into a video stream received through any of the ports as described above, such as the digital OTA TV port 231 or the digital cable TV input port 232. The video stream with the supplemental content is inserted therein, which is also referred to herein as an "output video stream" or "video output." The video output is then output to the display device 20 via the video output port 238.

In greater detail, the processor 210 generates a screen layout appearing on the display device 20 in which the screen is divided into sections according to the parameters established by the user. The processor 210 may perform control such that one section of the display shows the received video stream (i.e., the received video stream occupies a portion of the screen that is less than the total size of the screen, essentially reducing the portion of the screen occupied by the received video stream), and various other sections showing the supplemental content. In some embodiments, the processor generates a screen layout according to pre-set rules which may be stored in the memory storage 220, rather than using parameters established by the user. In certain embodiments, the web server may offer a graphical user interface for allowing the user to readily define how the screen layout should occur.

In addition to specifying how the display screen is divided into sections, the user may also designate (through the input methods described above) the sections in which the video stream is to be shown and in which section a particular type or instance of supplemental content is to be shown. The user may also determine times when certain supplemental content is to be shown, repetition information, etc. In some embodiments, the supplemental content contains metadata that specifies the times when certain supplemental content is to be shown and repetition information.

Figure 3A:
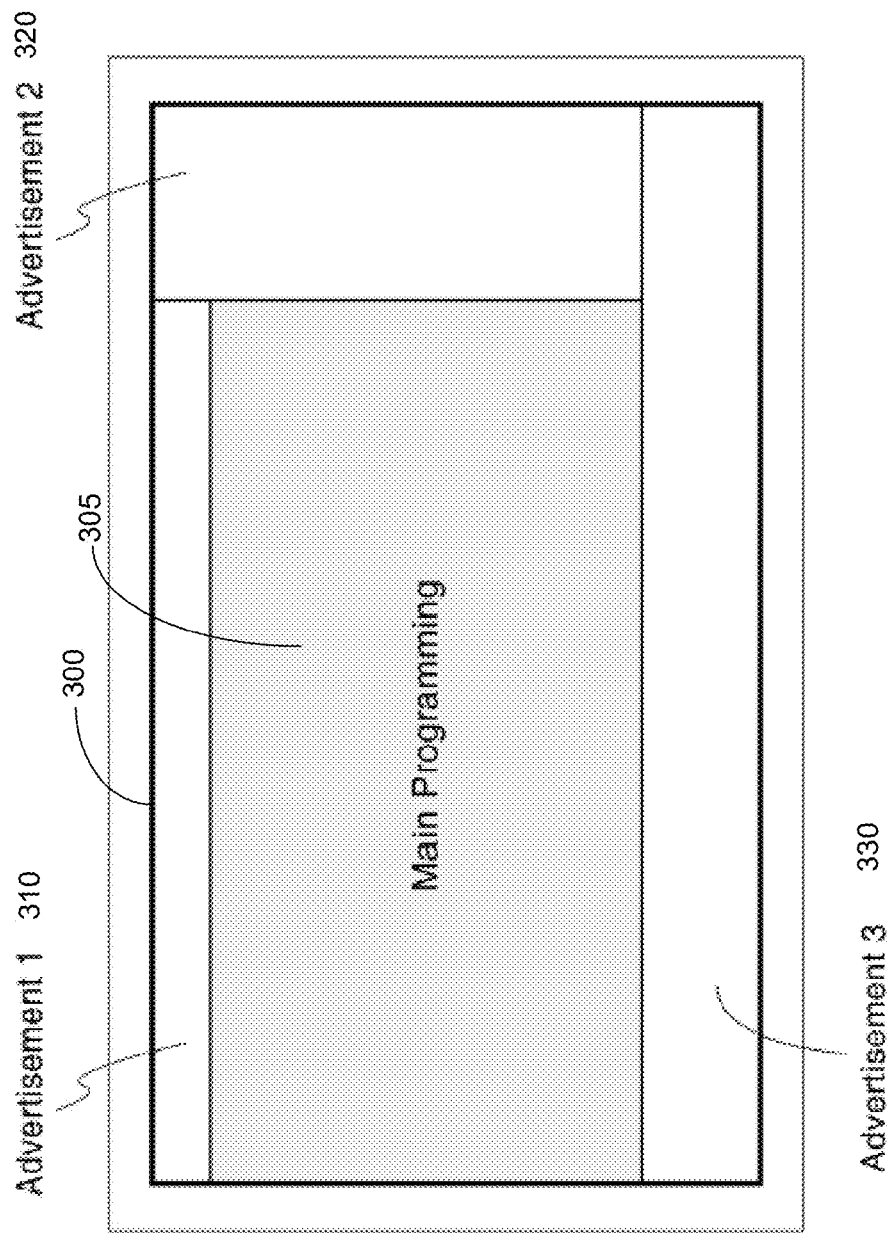
FIGS. 3A and 3B illustrate exemplary screen layouts as generated by the ad presentation controller according to embodiments of the present disclosure.

An example of a screen layout generated by the processor 210 is shown in FIG. 3A. In FIG. 3A, the received video stream is shown in a portion of the display screen 300 labeled "Main Programming" 305. Various advertisements in the supplemental content are shown in areas labeled as "Advertisement 1" 310, "Advertisement 2" 320, and "Advertisement 3" 330.

Figure 3B:
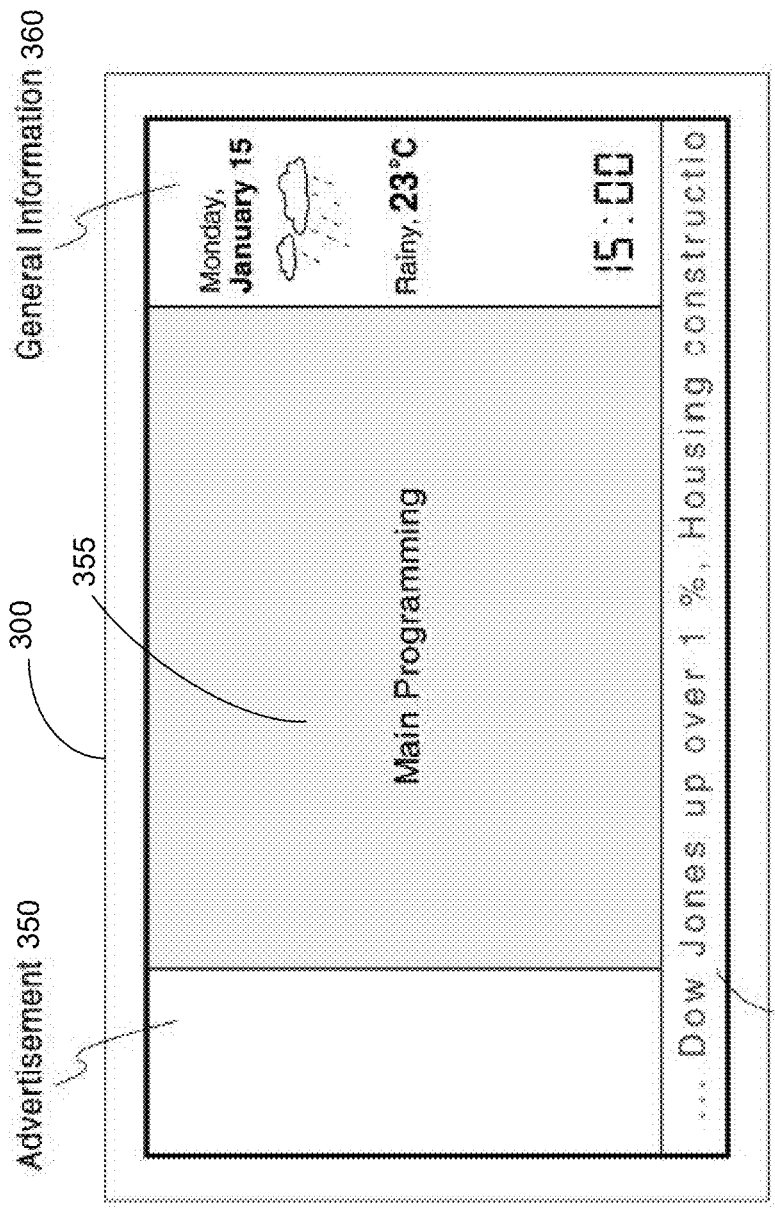

Another example of a screen layout generated by the processor 210 is shown in FIG. 3B. In FIG. 3B, the received video stream is shown in the section labeled "Main Programming" 355, and an advertisement in the supplemental content is shown in the section labeled "Advertisement" 350. In addition, scrolling news in the supplemental content is shown in the section labeled "News Ticker" 370. The supplemental content can be text based information scrolling as a single line banner, transparently or opaquely overlayed on a section of the television display. Various information in the supplement content or possibly obtained locally by the APC 10 (such as the time information) is shown in the section labeled "General Information" 360.

In some embodiments, some of the sections displaying the supplemental content may be shown in a PiP (picture-in-picture) format, in which case the portion of the screen occupied by the television video stream is not reduced by a corresponding amount to show these sections.

In some embodiments, the processor 210 analyzes an image signal obtained from the USB demographic camera connected to a USB port 234 or from the internal camera 250. The image signal is analyzed to generate demographic information of the people watching the display device 20, i.e., the viewers. For example, using facial recognition techniques, the processor 210 may determine the ages, sex ratio, and even ethnic makeup of the viewers.

Using the demographic information, the processor 210 may then select the supplemental content from the memory storage 220 suitable for the viewers and insert this supplemental content into the video stream in the manner described above. For example, the processor 210 may determine that the viewers are mostly children and therefore selects and presents supplemental content suitable for children, such as advertising content related to toys and amusement parks. As another example, using image processing techniques and programmed knowledge of contrast patterns formed by persons wearing a dress shirt, tie, and suit coat, the processor 210 may determine that the audience is primarily made up of businessmen and therefore select and present supplemental content suitable for businessmen, such as stock and weather information, or advertisements related to automobiles and alcoholic beverages.

In some embodiments, the demographic information generated by the processor 210 is transmitted to the web advertising portal, and the web advertising portal transmits supplemental content to the system via the Internet 100 through the Ethernet port 236 or through the wireless transceiver 240 with reference to the demographic information. That is, supplemental content suitable for the demographics of the audience is provided by the advertising server 30. In other embodiments, the processor 210 requests advertising content from the web advertising portal with reference to the demographic information. In some embodiments, the demographic information generated by the processor 210 is stored in the memory storage 220. In some embodiments, control is performed by the processor 210 so that the image signal obtained from the demographic camera is transmitted to the web advertising portal, after which the web advertising portal generates demographic information of viewers using the image signal, and then subsequently transmits supplemental content suitable for the demographics of the audience to the APC 10.

Control by the processor 210 referred to herein as "ad substitution" will now be described. In some embodiments, commercials in the video stream are detected and replaced with supplemental content ("ad substitution"). Commercials in the video stream may be detected by the processor 210 using one or a combination of well-known techniques. For example, blank frame detection (fading to black before a commercial and at the end of a commercial break), logo detection (TV station logos are usually removed during commercial breaks), scene change detection (determining that a large amount of the picture has changed), volume change detection (some TV stations increase the volume during commercials), or a combination of these methods may be used to detect the start and end of a commercial break.

After the start of a commercial break in the video stream is detected, the processor 210 may then replace the commercials in the commercial break with supplemental content, which may be stored in the memory 220, such that the supplemental content is shown in the section of the screen used for the received video stream. For example, the supplemental content is shown in the section labeled "Main Programming" in FIGS. 2 and 3 when the start of a commercial break in the received video stream is detected. The processor 210 may then discontinue showing the supplemental content at the end of the commercial break and return to normal programming. In some embodiments, the commercials in the received video stream are replaced with advertisements in the supplemental content.

In some embodiments, the processor 210 may perform control such that the supplemental content replacing the commercials during the commercial breaks occupies the entire screen, after which ad insertion in the manner described above is performed after the commercial breaks.

Figure 4:
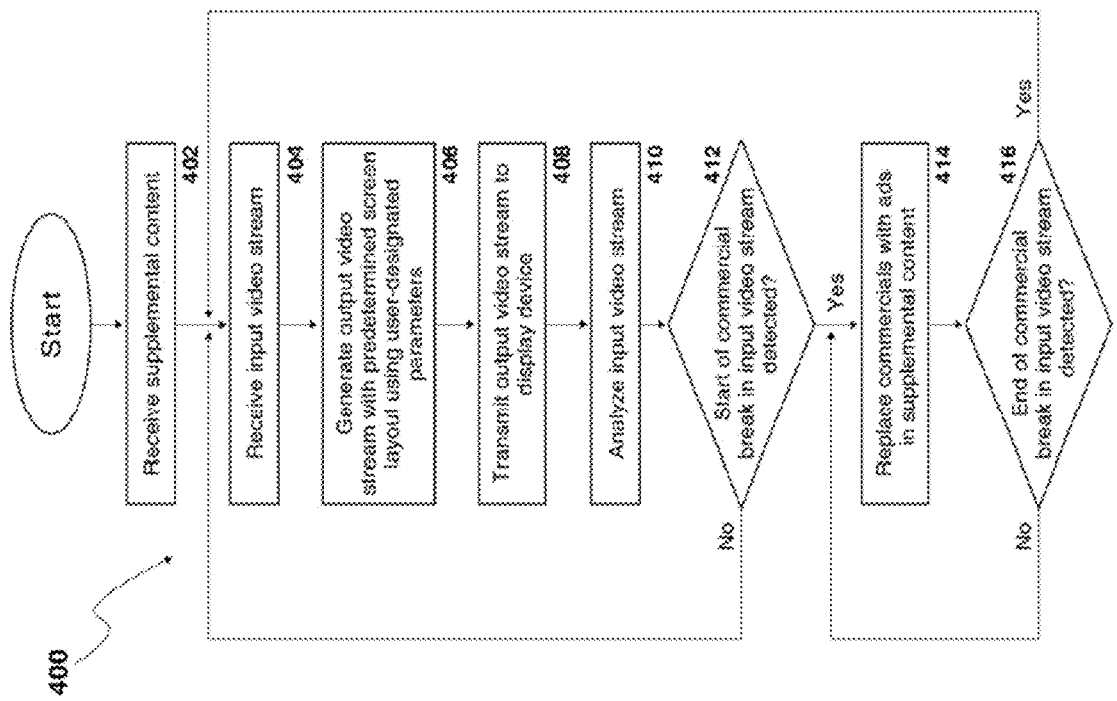
FIG. 4 is a flow diagram illustrating a combined method of ad insertion and ad substitution according to an embodiment of the present disclosure.

Referring to FIG. 4, a flow diagram will be described that illustrates a method of combined ad insertion and ad substitution according to an embodiment. The routine 400 begins at operation 402, where supplemental content is received from the web advertising portal through connection to the Internet via the Ethernet port 236, the wireless transceiver 240, or from the USB port 234 from a memory card. It should be appreciated that the supplemental content may also be supplied to the APC 10 in other ways, such as by the user via the web page provided using the web server, or by the user interfacing via the auxiliary port. Hence, the term "content port" may be used herein to denote the port through which the supplemental content is supplied, i.e., to denote one of the Ethernet port 236, the wireless transceiver 240, or the USB port 234. To simplify the illustration, it is assumed that the supply of the supplement content through either the web advertising portal or the user is a one-time event in which different types of advertising content and other information sufficient for a long period of use are included in the supplemental content. However, in some embodiments, the supplemental content is continuously updated, for example, at predetermined intervals or with reference to demographic information of the audience. In other embodiments, the supplemental content is continuously or periodically presented in a repetitive manner.

The routine 400 then continues to operation 404, where the APC 10 receives an input video stream. As described above, the input video stream may be received through the digital OTA TV port 231, the digital cable TV port 232, or a USB TV tuner or USB satellite TV tuner connected to the USB port 234. Other inputs, such as analog RGB or HMDI video signals, can be received at other types of input ports.

From operation 404, the routine 400 continues to operation 406, where the processor 210 generates an output video stream with a predetermined screen layout using the parameters input by the user or predefined in the APC 10. The predetermined screen layout includes one section showing the input video stream and at least one section showing the supplemental content. Typically, the output video stream is generated such that audio data from the input video stream is used as the audio portion of the output video stream. However, it is also possible for the audio data from the supplemental content to be used as the audio portion of the output video stream, and other embodiments may not be so limited in this respect.

The routine 400 subsequently continues to operation 408, where the output video stream is transmitted to the display device 20 via the video output port 238. From operation 408, the routine 400 continues to operation 410, where the processor 210 analyzes the input video stream.

The routine 400 then continues to operation 412, where a determination is made by the processor 210 as to whether the start of a commercial break in the input video stream is detected. If the start of a commercial break is detected, the operation 400 continues to operation 414, where commercials in the input video stream are replaced with advertisements in the supplemental content. If, at operation 412, the start of a commercial break is not detected, the routine 400 returns to operation 404, such that continued reception of the input video takes place.

From operation 414, the operation 400 continues to operation 416, where a determination is made as to whether the end of the commercial break in the input video stream is detected. If the end of the commercial break is detected, the routine 400 returns to operation 404, as described above. If the end of the commercial break is not detected, the routine 400 returns to operation 414, such that continued replacement of the commercials in the input video stream occurs.

In some embodiments, the processor 210 learns what the typical length of a commercial break is for a particular channel and even for a particular type of television programming (movies, news programs, etc.), and selects the advertisements in the supplemental content at operation 414 in a manner corresponding to the learned length of the commercial break. For example, a plurality of advertisement segments may be selected which when combined are at least as long as the learned length of the commercial break. As another example, one or more advertisement segments may be selected which when combined are much shorter than the learned length of the commercial break so that the one or more advertisements may be repeated at operation 414 until the end of the commercial break is detected at operation 416. Since the lengths of commercial breaks may vary even within a single program, for example, the lengths of commercial breaks at the beginning of a movie are typically shorter than the lengths of programs at the end of a movie, the processor 210 may learn such varying of the lengths of commercial breaks and may select the advertisements accordingly, or may select the advertisements in the supplemental content on the basis of the learned maximum possible commercial break for a channel or type of programming.

Control by the processor 210 referred to herein as "ad avoidance" will now be described. This embodiment can be accomplished using the context described in FIG. 1A. Recall in the deployment shown in FIG. 1A, the APC 10 controls the video signal sent to the display device 20 and can thus select which television channel is presented to the television. In some embodiments, when the start of a commercial break is detected, the channel is changed to another channel that is not showing commercials at the moment so that regular programming is continuously shown (ad avoidance). In some embodiments, the channel is changed to a channel with similar programming. As an example, if the channel is set to a news channel, then every time that a commercial is detected, the channel may be changed to another news channel so that news programming is continuously shown. Therefore, ad insertion is performed, and simultaneously, ad avoidance is performed for the section of the screen showing the input video signal.

In some embodiments, the channels may be grouped according to the type of programming that is shown on the channels (e.g., nature channels, documentary channels, news channels, and kids channels), and the processor 210 may change channels according to such grouping until a channel in a particular group is found that is not showing commercials. In other embodiments, the user can indicate a set of alternative channels to select. In some embodiments, the processor 210 may cycle through such a grouping until a channel in the group is found that is not showing commercials. Such information on the grouping of the channels may be stored in the memory 220 and accessed by the processor 210.

In certain situations, the above method is effective to ensure that the audience continues to watch the display device 20. For example, when a display device 20 is placed in a restaurant and the display device 20 is set to a news channel, whenever there is a commercial break, the customers in the restaurant may stop watching the display device 20 to engage in conversation with other customers, to pay more attention to their meals, to read a magazine at their table, etc. However, if news were continuously shown on the display device 20, the customers would be more likely to continue watching the programming, thus ensuring that the audience continues to watch the supplemental content inserted into the video stream.

In some embodiments, rather than switching from one channel to another similar channel (i.e., from one channel in a group to another channel in the group), the processor may switch channels with reference to the demographic information of the audience obtained by the processor 210. For example, demographics of the audience may be checked during predetermined intervals, such as every ten minutes, and the channel may be selected based on the outcome of the demographic analysis. In some embodiments, changing to a channel selected with reference to demographics may occur at the start of a commercial break.

As an example, it may be determined from the image signal output by the USB demographic camera connected to USB port 234 or by the internal camera 250 that the audience is mostly children, in which case a channel suitable for children may be selected. As another example, the audience may be made up of 75% adult men, no children, and 25% adult females, in which case a golf channel may be selected by the processor 210. The processor 210 may then proceed to perform ad insertion, ad substitution, or a combination thereof, as described above, also with reference to the generated demographics. Various "conditional scripts" may be stored in the memory 220 that the processor 210 may follow to select channels, depending on the demographic makeup of the audience. By ensuring that a channel is selected that appeals to all or most of the audience, the effectiveness of advertising is enhanced.

Figure 5:
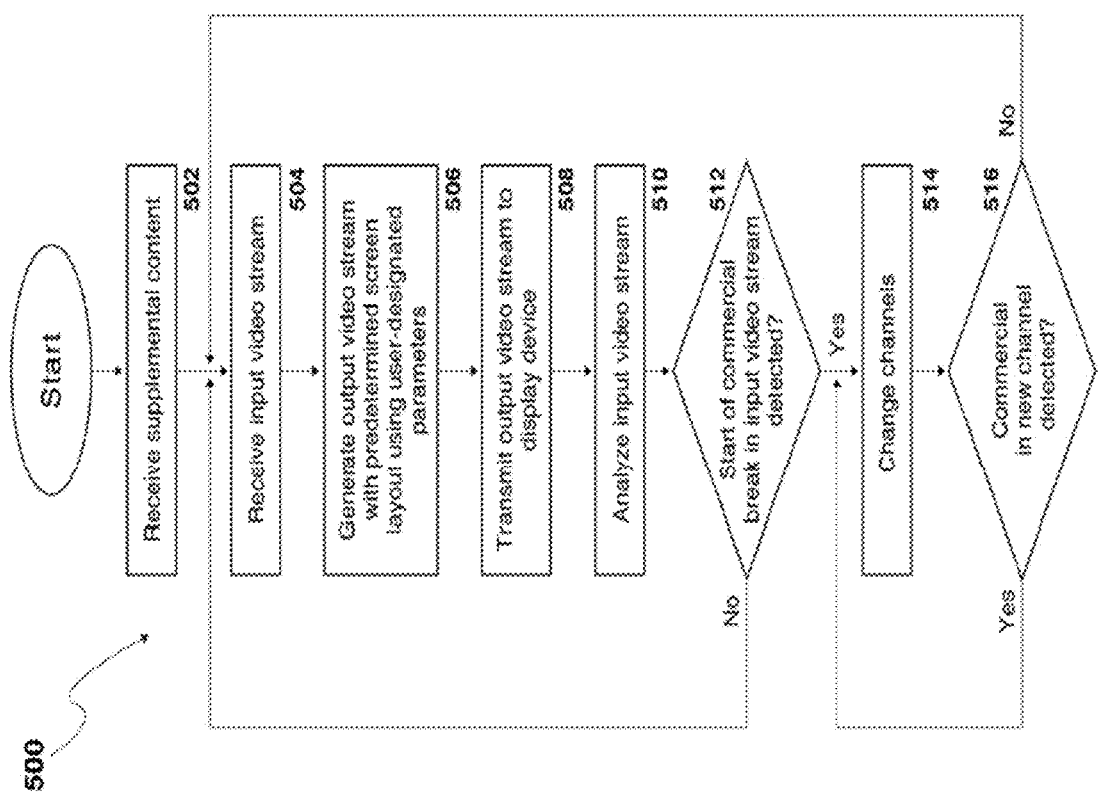
FIG. 5 is a flow diagram illustrating a combined method of ad insertion and ad avoidance according to an embodiment of the present disclosure.

Referring to FIG. 5, a flow diagram will be described that illustrates a method of combined ad insertion and ad avoidance according to an embodiment. The routine 500 begins at operation 502, where supplemental content is received from the web advertising portal through connection to the Internet via the Ethernet port 236, the wireless transceiver 240, or USB port 234.

The routine 500 then continues to operation 504, where the system 100 receives an input video stream. From operation 504, the routine 500 continues to operation 506, where the processor 210 generates an output video stream with a predetermined screen layout using the parameters input by the user. The predetermined screen layout includes one section showing the input video stream and at least one section showing the supplemental content.

The routine 500 subsequently continues to operation 508, where the output video stream is transmitted to the display device 20 via the video output port 238. From operation 508, the routine 500 continues to operation 510, where the processor 210 analyzes the input video stream. The routine 500 then continues to operation 512, where a determination is made by the processor 210 as to whether the start of a commercial break in the input video stream is detected. If the start of a commercial break is not detected, the routine 500 returns to operation 504, where the APC 10 receives the input video stream (i.e., continued reception of the input video takes place).

If, at operation 512, the start of a commercial break is detected, the operation 500 continues to operation 514, where the channel is changed. As described above, the channel can be changed to a channel in the same group or based on demographics.

From operation 514, the routine 500 continues to operation 516, where a determination is made as to whether a commercial is detected in the new channel. If a commercial is detected in the new channel, the routine 500 returns to operation 514, such that the channel is changed again. If, at operation 516, a commercial is not detected in the new channel, the routine 500 returns to operation 502, where the APC 10 receives the input video stream (i.e., continued reception of the input video takes place).

The various embodiments described above are provided by way of illustration only. Those skilled in the art will readily recognize various modifications and changes that may be made to the principles, techniques, and methods disclosed herein without following the example embodiments and applications illustrated and described herein, and without departing from the true spirit and scope of the present invention, which is set forth in the following claims.

The invention claimed is:

1. A method for controlling presentation of advertising content in a video stream provided to a television, comprising:

determining, by a computer executing an advertisement presentation controller, a screen layout comprising a first section and a second section with reference to user-designated parameters;

generating, by the computer, an output video stream comprising commercially available television video signals received at an input port and supplemental content received at a content port that is distinct from the input port, the television video signals comprising a commercial, wherein the output video stream is configured so that the television video signals are displayed in the first section of the screen layout and the supplemental content is displayed in the second section of the screen layout, and wherein the supplemental content is displayed in a repetitive manner and the supplemental content contains metadata that specifies repetition information, the generating further comprising specifying times when the supplemental content is to be shown;

causing, by the computer, the output video stream to be displayed on the television;

analyzing, by the computer, the television video signals to detect a start of the commercial;

generating, by the computer, demographic information in response to receiving an image signal from a camera pointed towards viewers of the television; and changing channels, by the computer and without human intervention, until another channel is found that is not presently showing another commercial, wherein a selection of the another channel is based on the demographic information.

2. The method of claim 1, wherein the supplemental content is received from a web advertising portal and the content port comprises either an Ethernet port connected to the Internet or a wireless transceiver wirelessly connected to the Internet.

3. The method of claim 1, further comprising:
wherein the output video stream is generated by selecting advertisements in the supplemental content based on the demographic information, and
wherein configuring the output video stream is configured to display the selected advertisements in the second section of the screen layout.

4. A method for controlling presentation of advertising content in a video stream provided to a television, comprising:
receiving, at a computer executing an advertisement presentation controller, at an input port an input video stream comprising commercially available television video signals, the available television video signals comprising a commercial;
receiving, at the computer, supplemental content;
causing, by the computer, the input video stream and the supplemental content to be displayed simultaneously on the television, wherein the supplemental content is displayed in a repetitive manner and the supplemental content contains metadata that specifies repetition information;
analyzing, by the computer, the input video stream to detect a start of the commercial;
generating, by the computer, demographic information in response to receiving an image signal from a camera pointed towards viewers of the television; and
changing channels, by the computer and without human intervention, until another channel is found that is not presently showing another commercial, wherein a selection of the another channel is based on the demographic information.

5. The method of claim 4, wherein changing channels comprises changing from a first channel that is showing the commercial to a second channel with similar programming content that is not showing the other commercial.

6. A system for inserting advertising content in a video stream, comprising:
an input port configured to receive an input video stream comprising television signals from a commercial television signal service provider;
a video output port for connection to a television, the video output port providing an output video stream to the television;
a content port for receiving supplemental content; and
a processor configured to
determine a screen layout for the output video stream including a plurality of sections based on user-designated parameters or using pre-set rules,
generate the output video stream comprising the input video stream and the supplemental content, wherein the input video stream is shown in a first section of the screen layout and the supplemental content is shown in a second section of the screen layout, and wherein the supplemental content is displayed in a repetitive manner and the supplemental content contains metadata that specifies repetition information, and
cause the output video stream to be displayed on the display device,
analyze the input video stream to detect a start of a commercial in the input video stream and an end of the commercial in the input video stream,
generate demographic information in response to receiving an image signal from a camera directed to viewers of the television, and
change channels without human intervention to another channel that is not presently showing another commercial using the demographic information.

7. The system of claim 6, wherein the content port comprises an Ethernet port or a wireless transceiver for connection to the Internet, and the supplemental content is received from a web advertising portal through the content port.

8. The system of claim 6, wherein the output video stream comprises selected advertisements from the supplemental content based on the demographic information, and wherein the selected advertisements is presented in the second section of the screen layout.

9. The system of claim 6, wherein a web page is provided using a web server, and the processor determines the screen layout using parameters designated by the user through the web page.

10. A system for controlling presentation of advertising content in a video stream, the system comprising:
an input port configured to receive an input video stream comprising television signals from a commercial television signal service provider;
a content port for receiving supplemental content ;
a video output port for connection to a television, the video output port providing an output video stream to the television; and
a processor configured to
generate the output video stream comprising the input video stream and the supplemental content,
causing the input video stream and the supplemental content in the output video stream to be displayed simultaneously on the television, wherein the supplemental content is displayed in a repetitive manner and the supplemental content contains metadata that specifies repetition information, analyze the input video stream to detect a start of a commercial in the input video stream and an end of the commercial in the input video stream, generate demographic information in response to receiving an image signal from a camera directed to viewers of the television, and change channels without human intervention to another channel that is not presently showing another commercial using the demographic information.

11. The system of claim 10, wherein changing channels comprises changing from a first channel that is showing the commercial to a second channel with similar programming that is not showing another commercial.

12. A non-transitory computer-readable storage medium having computer-readable instructions that, when executed by a computer, cause the computer to:

determine a screen layout associated with an output video signal using user-designated parameters, wherein the screen layout comprises a first section and a second section;

generate the output video signal,
wherein the output video signal comprises an input video stream,
wherein the input video stream comprises commercially available television signals received at an input port, the available television video signals comprising a commercial,
wherein at least a portion of the content of the input video stream is shown in the first section of the screen layout and supplemental content received through a content port is shown in the second section of screen layout,
wherein the supplemental content is displayed in a repetitive manner and the supplemental content contains metadata that specifies repetition information;

cause the output video signal to be displayed on a television;

analyze the input video stream to detect a start of the commercial;

generate demographic information in response to receiving an image signal from a camera pointed towards viewers of the television; and change channels, without human intervention, until another channel is found that is not presently showing another commercial, wherein a selection of the another channel is based on the demographic information.

13. The non-transitory computer-readable storage medium of claim 12, wherein the output video stream comprises a selected advertisement from the supplemental content with reference to the demographic information, and wherein generate the output video signal is generated such that the selected advertisement is shown in the second section of the screen layout.

14. The non-transitory computer-readable storage medium of claim 12,
wherein the supplemental content comprises text information, and
further comprising computer-readable instructions that when executed by the computer cause the computer to generate the output video signal such that the text information appears as scrolling in the second section of the screen layout.

15. The non-transitory computer-readable storage medium of claim 13, further comprising computer-readable instructions that, when executed by the computer, cause the computer to:
transmit the demographic information to an advertising server.

16. The non-transitory computer-readable storage medium of claim 14 wherein the computer-readable instructions that when executed by the computer cause the computer to read the supplemental content from a memory card connected to a USB port.

* * * * *